United States Patent
Chiang

[19]

[11] Patent Number: 5,979,923
[45] Date of Patent: Nov. 9, 1999

[54] BICYCLE WITH AN IMPROVED CRANK GEARWHEEL ASSEMBLY

[76] Inventor: Douglas Chiang, 487, Ko-Chung Rd., Ta-Li City Taichung hsien, Taiwan

[21] Appl. No.: 09/111,712

[22] Filed: Jul. 8, 1998

[51] Int. Cl.$^6$ ............................................. G05G 1/14
[52] U.S. Cl. ........................................ 280/259; 74/594.2
[58] Field of Search ................... 280/259, 260; 74/594.1, 594.2, 594.3

[56] References Cited

U.S. PATENT DOCUMENTS

| | | | |
|---|---|---|---|
| 4,811,626 | 3/1989 | Bezin | 74/594.1 |
| 5,179,873 | 1/1993 | Girvin | 280/259 |
| 5,246,402 | 9/1993 | Romano | 74/594.2 |
| 5,257,562 | 11/1993 | Nagano | 74/594.2 |
| 5,480,359 | 1/1996 | Tani | 74/594.2 |
| 5,644,953 | 7/1997 | Leng | 74/594.2 |

FOREIGN PATENT DOCUMENTS

| | | | |
|---|---|---|---|
| 861561 | 2/1941 | France | 74/594.1 |
| 981600 | 5/1951 | France | 74/594.1 |

*Primary Examiner*—Kevin Hurley
*Attorney, Agent, or Firm*—Bacon & Thomas, PLLC

[57] ABSTRACT

A crank gearwheel assembly for use with a bicycle, mainly includes a hollow crank body and a pair of integrated gearwheels of different diameters coupled to the crank body thereby avoiding an angular deviation between the gearwheels, and offering easy assembly, accurate speed-change, and reduced weight for a more light and speedy bicycle.

2 Claims, 4 Drawing Sheets

BICYCLE WITH AN IMPROVED CRANK GEARWHEEL ASSEMBLY

BACKGROUND OF THE INVENTION

1. Field of the Invention

The present invention relates to a bicycle used for cross-country, particularly an improved crank gearwheel assembly for providing a variable speed arrangement for such a bicycle.

2. Description of Prior Art

As known, a variety of bicycles are continuously proposed in compliance with different demands in the present bicycle industry. Especially in bicycling for cross-country, it is hard to maintain a more light and speedy feature of the bicycle body under the consideration of safety.

A crank gearwheel assembly used in a conventional bicycle, as shown in FIG. 1, generally includes a crank body 1A of which a top end integrally forms a coupling portion 4A. The coupling portion 4A is further configured with five retentive claws 41A to which larger diameter and smaller diameter gearwheels 5A, 6A together are secured thereto. In manufacture, the gearwheels of different diameters 5A, 6A are separately fabricated by a lathe process and then screwed to the five retentive claws 41A. Through a stamping process, it often occurs that some burrs appear on the gearwheels 5A, 6A resulting in an inadequate quality and inaccurate assembly. Additionally, due to separate fabrication of the gearwheels 5A, 6A, the gearwheels 5A, 6A may have inconsistent fit tolerances with regard to the crank body 1A when both of the gearwheels 5A, 6A are respectively screwed to the crank body 1A. Accordingly, an angular deviation may appear between the screwed gearwheels 5A, 6A resulting in an inaccurate action of a derailleur system used in conjunction with the crank gearwheel assembly. Therefore, it is understood that such a crank gearwheel assembly basically lacks economic effectiveness and usefulness.

Recently, although some bicycles utilize the feature of separately fabricating the crank body 1A and the coupling portion 4A to constitute two independent structures, thereby achieving a better quality in manufacture, the crank body 1A is still formed as a solid construction and also screwed together with the coupling portion 4A. Not only may the above-mentioned problem not be resolved, but also another problem of weighting the whole bicycle results.

SUMMARY OF THE INVENTION

Based on the foregoing disadvantage, it is the objective of this present invention to provide an improved crank gearwheel assembly for use with a bicycle, which offers easy assembly, accurate speed-change, and reduced weight for a more light and speedy bicycle, thereby simultaneously achieving economic advantage and usefulness.

BRIEF DESCRIPTION OF THE DRAWINGS

In order that the present invention may more readily be understood, the following description is given, merely by way of example, with reference to the accompanying drawings, in which.

DETAILED DESCRIPTION OF THE PREFERRED EMBODIMENTS

Figure 1:
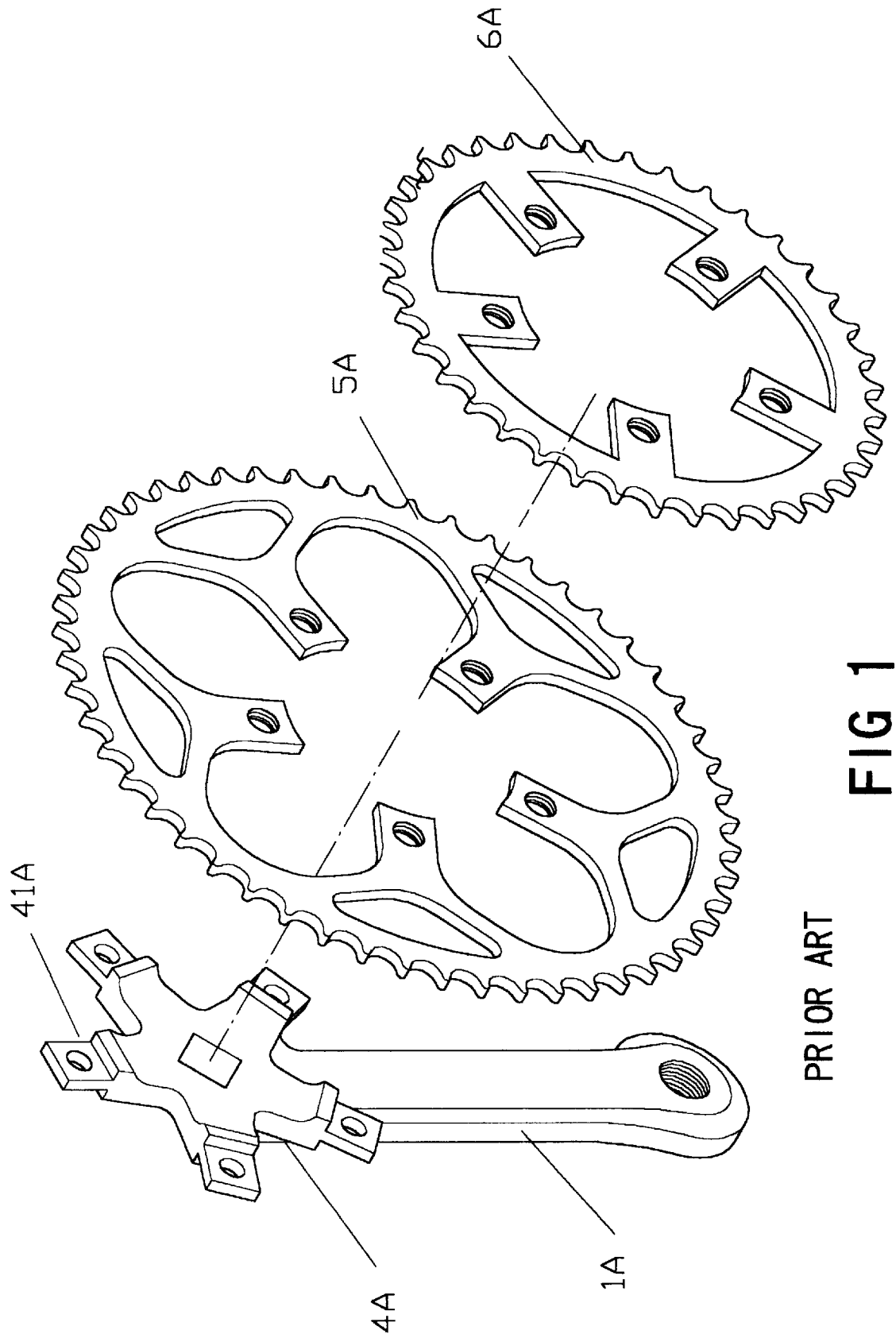
FIG. 1 is an exploded perspective view of a conventional crank gearwheel assembly.
Figure 3:
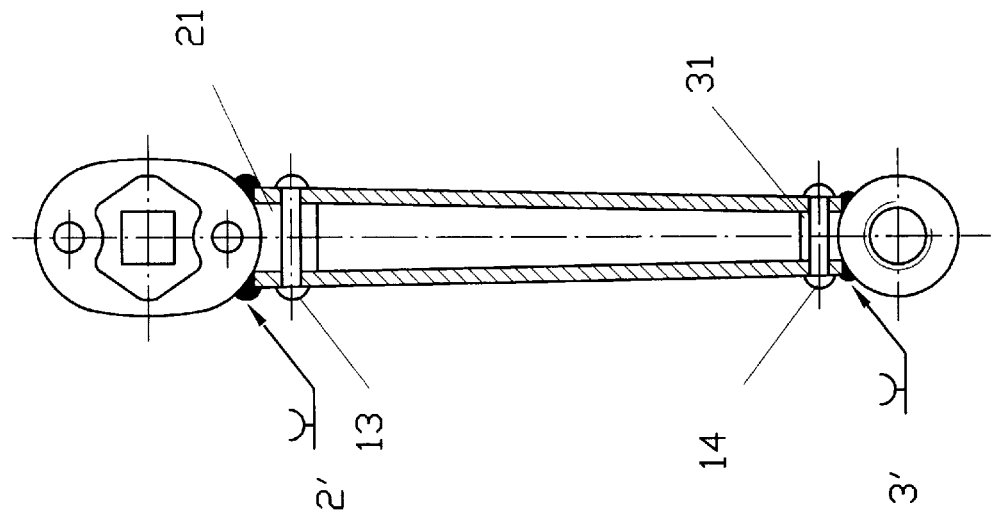
FIG. 3 is a cross-sectional view of the crank body shown in FIG. 2.
Figure 2:
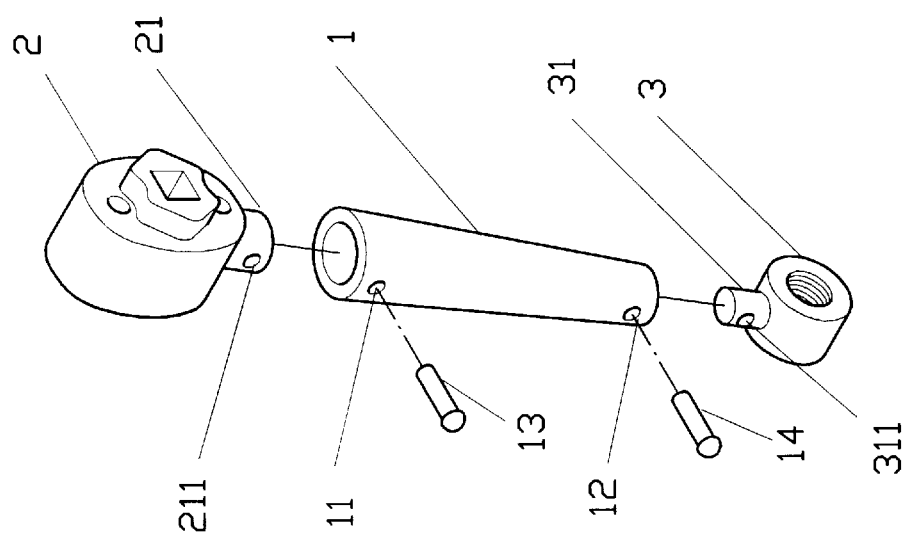
FIG. 2 is an exploded perspective view of a crank body of a crank gearwheel assembly in accordance with the present invention.
Figure 4:
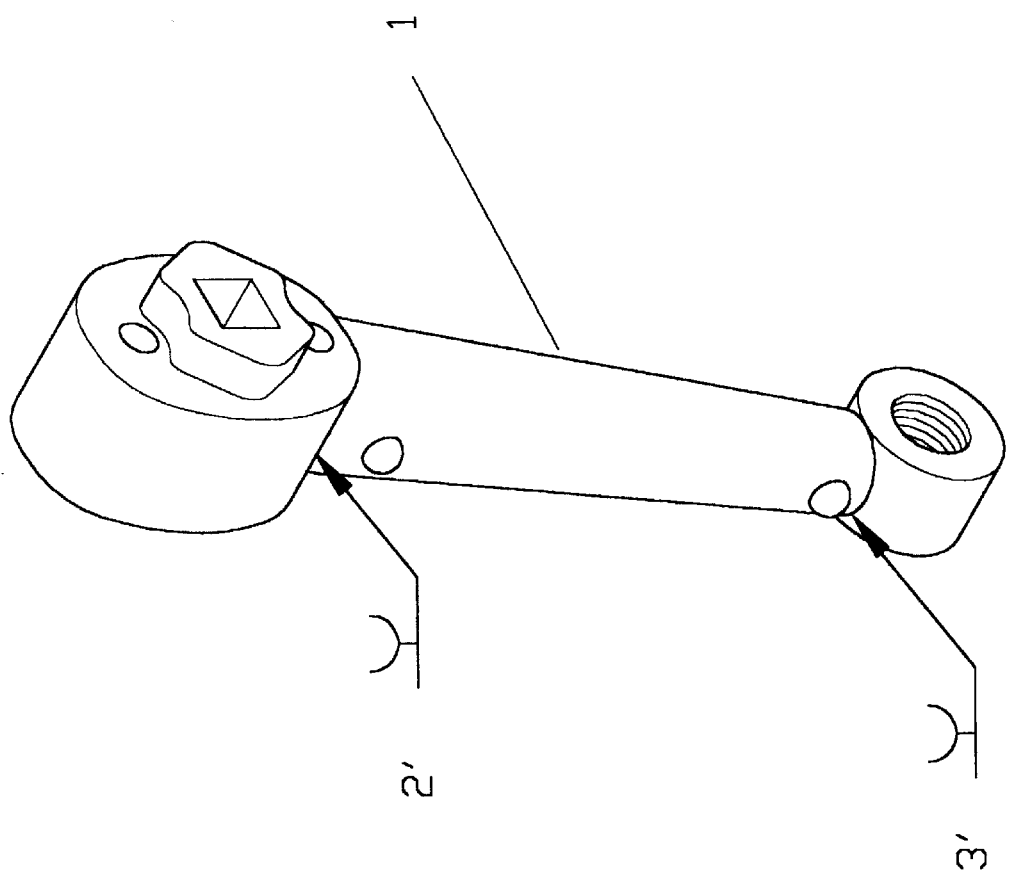
FIG. 4 is an assembled perspective view of the crank body shown in FIG. 1.

Referring to the exploded and cross-sectional views shown in FIGS. 2 and 3, the present invention mainly includes a crank body 1 of hollow construction. Top and bottom bores 11, 12 respectively extend transversely through top and bottom portions of the crank body 1 for receiving two rivets 13, 14. A head portion 2 and a pedal hole portion 3 are adapted to be separately soldered with the top and bottom portions of the crank body 1, wherein the head portion 2 further forms a first protrusion 21 and a first cavity 211 corresponding to the crank body 1, and the pedal hole portion 3 forms a second protrusion 31 and a second cavity 311.

In assembly of the above-mentioned parts, the first protrusion 21 of the head portion 2 and the second protrusion 31 of the pedal hole portion 3 are respectively inserted within an internal region of the hollow crank body 1. Then, two mating surfaces 2', 3' adjacent to the top and bottom portions of the crank body 1 are respectively soldered with the top and bottom portions of the crank body 1. The two rivets 13, 14 are further respectively riveted through the first cavity 211 of the head portion 2 and the second cavity 311 of the pedal hole portion 3. Therefore, a light and firm crank body 1 is achieved.

It is noted that since the head portion 2 and the pedal hole portion 3 are respectively soldered with the hollow crank body 1, the first and second protrusions 21, 31 thereof are designed to enhance the firm connections therebetween, thereby providing a preferable degree of safety.

Figure 5:
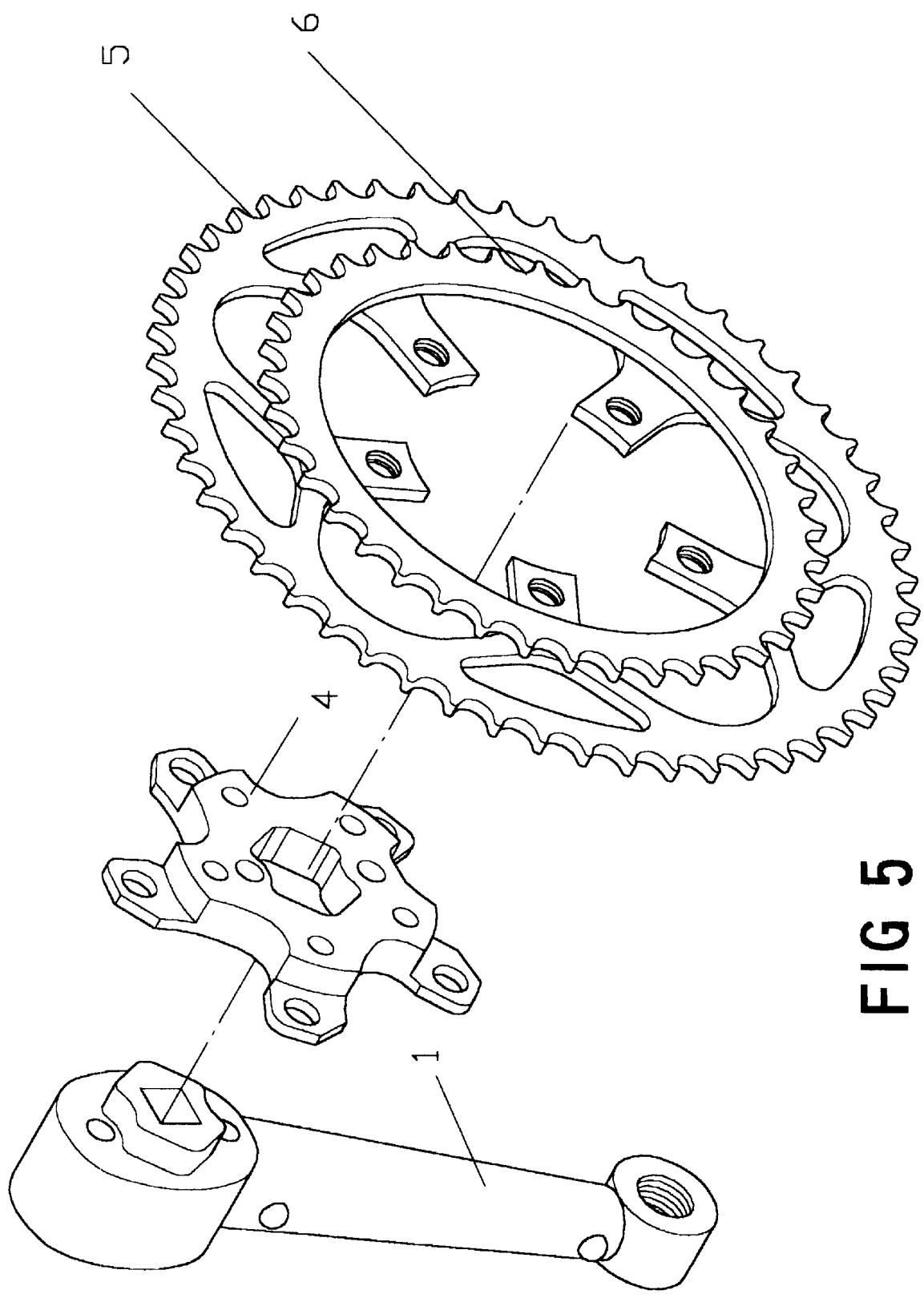
FIG. 5 is an exploded perspective view of the crank gearwheel assembly in accordance with the present invention.

In addition, referring to FIG. 5 which shows an assembled perspective view of the crank gearwheel assembly in accordance with the present invention, it is apparent that two gearwheels 5, 6 of different diameters are designed to be an integrated structure in a tight arrangement. Accordingly, the disadvantages such as different fit tolerances, angular deviation and excessive weight existing in the separate fabrication of the conventional gearwheels will not occur with the integrated gearwheels 5, 6 of the improved crank gearwheel assembly in accordance with the present invention.

In conclusion, it is known that the crank gearwheel assembly in accordance with the present invention actually offers more merits in comparison with the conventional assembly in structure and cost.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced with their scope.

I claim:

1. A crank gearwheel assembly for a bicycle, comprising:
    a hollow crank body with a top bore formed through a top portion thereof and a bottom bore formed through a bottom portion thereof, the top portion having a top mating surface and the bottom portion having a bottom mating surface;
    a head portion having a bottom end which includes a first protrusion and a first cavity formed in the first protrusion, the first protrusion extending into the top portion of the hollow crank body such that the first cavity is aligned with the top bore and the head portion is adjacent and soldered only to the top mating surface;

a first rivet extending through the top bore and the first cavity to further secure the head portion to the top portion of the crank body;

a pedal hole portion having a top end which includes a second protrusion and a second cavity formed in the second protrusion, the second protrusion extending into the bottom portion of the hollow crank body such that the second cavity is aligned with the bottom bore and the pedal hole portion is adjacent and soldered only to the bottom mating surface; and a second rivet extending through the top bore and the second cavity to further secure the pedal hole portion to the bottom portion of the crank body.

2. A crank gearwheel assembly according to claim 1, further comprising:

a coupling portion screwed to the head portion; and an integral set of at least two gearwheels of different diameters formed in a tight arrangement, the integral set of gearwheels being attached to the coupling portion.

\* \* \* \* \*